(12) United States Patent
Bass et al.

(10) Patent No.: US 8,918,588 B2
(45) Date of Patent: Dec. 23, 2014

(54) MAINTAINING A CACHE OF BLOCKS FROM A PLURALITY OF DATA STREAMS

(75) Inventors: Brian Bass, Apex, NC (US); Giora Biran, Zichron-Yaakov (IL); Hubertus Franke, Cortlandt Manor, NY (US); Amit Golander, Tel-Aviv (IL); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 12/419,523

(22) Filed: Apr. 7, 2009

(65) Prior Publication Data

US 2010/0257320 A1    Oct. 7, 2010

(51) Int. Cl.
*G06F 12/02*    (2006.01)
*G06F 12/12*    (2006.01)

(52) U.S. Cl.
CPC .......... *G06F 12/121* (2013.01); *G06F 12/123* (2013.01)
USPC .......... 711/133; 711/118; 711/154; 711/158; 711/170; 711/171

(58) Field of Classification Search
USPC .......... 711/136, 118, 133, 154, 158, 170, 171
See application file for complete search history.

(56) References Cited

U.S. PATENT DOCUMENTS

| | | | |
|---|---|---|---|
| 5,787,471 A * | 7/1998 | Inoue et al. .................... | 711/133 |
| 6,078,996 A * | 6/2000 | Hagersten .................... | 711/137 |
| 6,141,731 A * | 10/2000 | Beardsley et al. ............. | 711/136 |
| 6,349,372 B1 * | 2/2002 | Benveniste et al. ........... | 711/159 |
| 6,657,565 B2 | 12/2003 | Kampf | |
| 6,842,826 B1 | 1/2005 | McNutt | |
| 6,879,266 B1 | 4/2005 | Dye et al. | |
| 6,983,356 B2 * | 1/2006 | Rotithor et al. ............... | 711/213 |
| 7,129,860 B2 | 10/2006 | Alvarez, II et al. | |
| 7,392,340 B1 * | 6/2008 | Dang et al. ..................... | 711/111 |
| 8,140,772 B1 * | 3/2012 | Yang .............................. | 711/141 |
| 2004/0022094 A1 * | 2/2004 | Radhakrishnan et al. ..... | 365/200 |
| 2004/0049639 A1 * | 3/2004 | So et al. ......................... | 711/137 |
| 2005/0251630 A1 * | 11/2005 | Matthews et al. ............. | 711/138 |
| 2006/0041722 A1 * | 2/2006 | Hakura et al. ................. | 711/137 |
| 2006/0143394 A1 * | 6/2006 | Petev et al. .................... | 711/133 |
| 2006/0143395 A1 * | 6/2006 | Zohar et al. ................... | 711/133 |
| 2006/0190688 A1 * | 8/2006 | Van Eijndhoven et al. ... | 711/137 |
| 2008/0122665 A1 * | 5/2008 | Paris ............................... | 341/87 |
| 2010/0228928 A1 * | 9/2010 | Asnaashari et al. .......... | 711/154 |

* cited by examiner

*Primary Examiner* — Arpan P. Savla (74) *Attorney, Agent, or Firm* — Ryan, Mason & Lewis, LLP (57) ABSTRACT

Techniques for replacing one or more blocks in a cache, the one or more blocks being associated with a plurality of data streams, are provided. The one or more blocks in the cache are grouped into one or more groups, each corresponding to one of the plurality of data streams. One or more incoming blocks are received. To free space, the one or more blocks of the one or more groups in the cache are invalidated in accordance with at least one of an inactivity of a given data stream corresponding to the one or more groups and a length of the one or more groups. The one or more incoming blocks are stored in the cache. A number of data streams maintained within the cache is maximized.

21 Claims, 8 Drawing Sheets

Group A (Active) 502: $A_1, A_2, A_3, A_4, A_5, A_6, A_7, A_8, A_9, \ldots, A_{13}$ = 13 BLOCKS Group B (Active) 504: $B_1, B_2, B_3, B_4, B_5, B_6, B_7, B_8, B_9, \ldots, B_{15}$ = 15 BLOCKS Group C (Active) 506: $\boxtimes$ (507), $C_2, C_3, C_4, C_5, C_6, C_7, C_8, C_9, \ldots, C_{17}$ = 17 BLOCKS Group D (Active) 508: $D_1, D_2, D_3, D_4, D_5, D_6, D_7, D_8, D_9, \ldots, D_{11}$ = 11 BLOCKS Group E (Active) 510: $E_1, E_2, E_3, E_4, E_5, E_6, E_7, E_8$ = 8 BLOCKS

| | | | | | | | | | | | |
|---|---|---|---|---|---|---|---|---|---|---|---|
| 602 — GROUP A: (ACTIVE) | $A_1$ | $A_2$ | $A_3$ | $A_4$ | $A_5$ | $A_6$ | $A_7$ | $A_8$ | $A_9$ | ••• | $A_{13}$ = 13 BLOCKS |
| 604 — GROUP B: (ACTIVE) | $B_1$ | $B_2$ | $B_3$ | $B_4$ | $B_5$ | $B_6$ | $B_7$ | $B_8$ | $B_9$ | ••• | $B_{15}$ = 15 BLOCKS |
| 606 — GROUP C: (ACTIVE) | ⊠ 607 | $C_2$ | $C_3$ | $C_4$ | $C_5$ | $C_6$ | $C_7$ | $C_8$ | $C_9$ | ••• | $C_{16}$ = 16 BLOCKS |
| 608 — GROUP D: (ACTIVE) | $D_1$ | $D_2$ | $D_3$ | $D_4$ | $D_5$ | $D_6$ | $D_7$ | $D_8$ | $D_9$ | ••• | $D_{11}$ = 11 BLOCKS |
| 610 — GROUP E: (ACTIVE) | $E_1$ | $E_2$ | $E_3$ | $E_4$ | $E_5$ | $E_6$ | $E_7$ | $E_8$ | $E_9$ | | = 9 BLOCKS |

MAINTAINING A CACHE OF BLOCKS FROM A PLURALITY OF DATA STREAMS

FIELD OF THE INVENTION

The present invention relates generally to data management and, more particularly, to techniques for replacing data in a cache.

BACKGROUND OF THE INVENTION

A hardware decompression engine that supports many concurrent compressed data streams may require a cache. A decompression cache may hold multiple segments of active data streams which require history based decompression. At the same time, a decompression cache is of finite size and cannot always hold the entire history for all active data streams. In practice, an active data stream can be quite large and instead of storing multiple data stream histories in their entirety on a cache, a portion of the most recent data for each data stream is stored.

In addition to controlling the amount of data stored in the cache for each data stream, a cache replacement policy may also be utilized to maximize the usage of space in the cache. For instance, a cache replacement policy may determine which data in the cache are to be replaced by newly incoming data. Known cache replacement policies include: Least Recently Used (LRU), Least Frequently Used (LFU), Random, LRU-2, 2Q, and Adaptive Replacement Cache (ARC). These cache replacement policies are all derived from the storage or processor (instruction/data) domains and are based on system addresses. However, these existing cache replacement policies are insufficient in handling decompression caches.

SUMMARY OF THE INVENTION

Illustrative principles of the present invention provide techniques that overcome the above-mentioned drawbacks associated with existing cache replacement methods by providing techniques that address the above needs, as well as other needs. Particularly, principles of the invention provide techniques for efficiently replacing one or more blocks of data in a cache.

For example, in one embodiment of the invention a computer-implemented method for replacing one or more blocks in a cache, the one or more blocks being associated with a plurality of data streams, is provided. The method comprises executing steps on a computer. The one or more blocks in the cache are grouped into one or more groups, each group corresponding to one of the plurality of data streams. One or more incoming blocks are received. To free space, the one or more blocks of the one or more groups in the cache are invalidated in accordance with at least one of an inactivity of a given data stream corresponding to the one or more groups and a length of the one or more groups. The one or more incoming blocks are stored in the cache. A number of data streams maintained within the cache is maximized.

In additional embodiments, the above technique for replacing one or more blocks in a cache, the one or more blocks being associated with a plurality of data streams, may be carried out by an apparatus and/or a computer program product.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the present invention will be described in conjunction with exemplary methods for replacing one or more blocks in a cache, the one or more blocks being associated with a plurality of data streams. In one embodiment, a history-based cache replacement policy will be illustrated. It should be understood, however, that the invention is not limited to the particular embodiments described herein and modifications to the illustrative embodiments will become apparent to those skilled in the art given the teachings described herein.

The term "block" as used herein is intended to be construed broadly so as to encompass, by way of example and without limitation, any portion of one or more datum. In an illustrative embodiment, 128 kilobytes (KB) of memory may comprise sixty-four blocks of two KB units.

The term "cache" as used herein is intended to be construed broadly so as to encompass, by way of example and without limitation, any storage mechanism which may be used for high-speed access of one or more datum.

The term "data stream" as used herein is intended to be construed broadly so as to encompass, by way of example and without limitation, any flow of one or more datum from a specific source.

Conventional cache replacement policies fail to efficiently manage caches handling data from multiple data streams. For instance, conventional cache replacement policies may utilize a simplistic replacement algorithm such as keeping the most recently acquired data in the cache regardless of any other factors. Or, some replacement algorithms replace data in the cache that are least recently used, which may lead to a "round robin" scenario where no data streams can be maintained as will be explained below with reference to FIG. 7.

Illustrative embodiments of the invention exploit three general observations regarding cache management. First, data most recently stored in a cache (e.g., recent history) is the most frequently accessed. Second, the most recent data of active data streams are accessed with high probability and at least one block of data of a given data stream must be present in the cache to maintain the given data stream. And third, data of inactive data streams are infrequently accessed.

Figure 1:
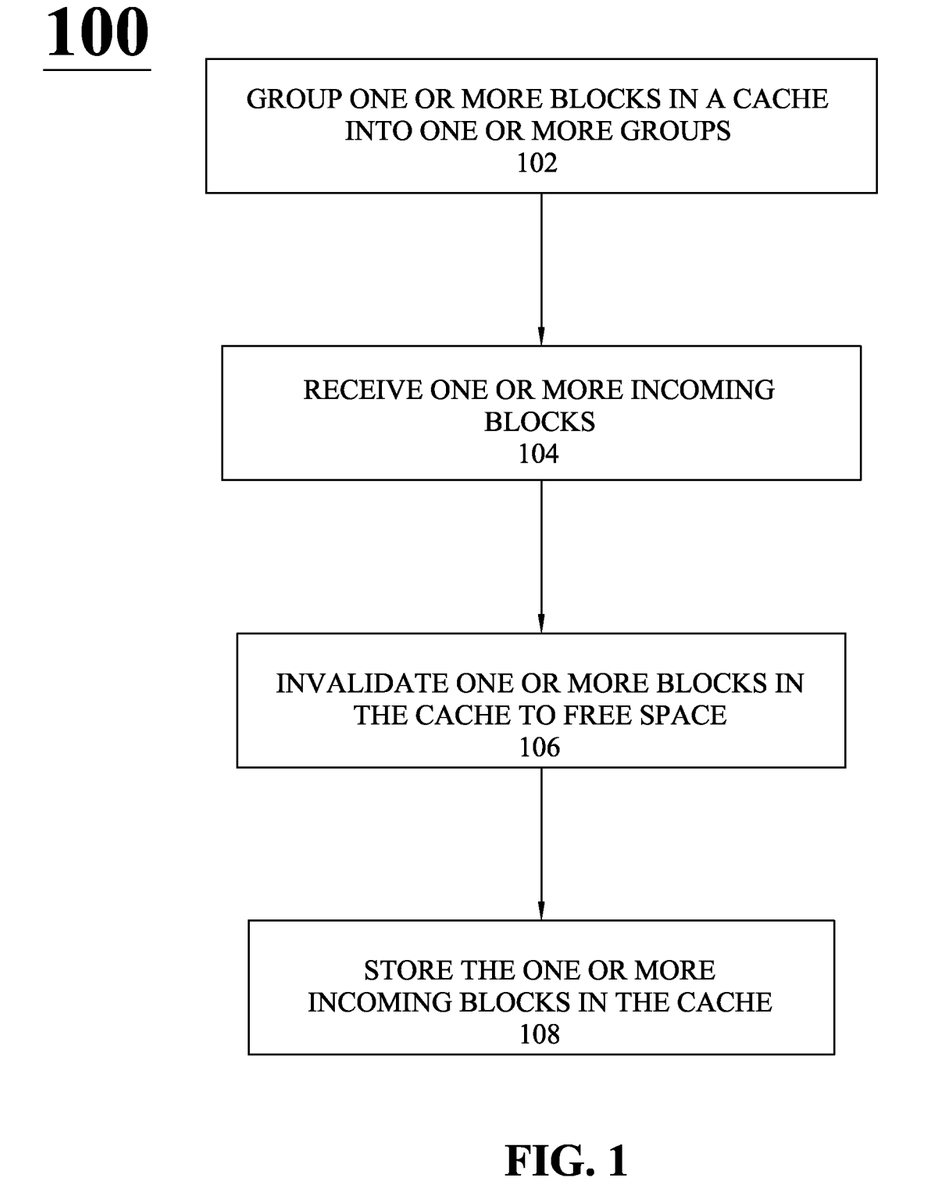
FIG. 1 is a flow diagram illustrating an exemplary methodology for replacing one or more blocks in a cache, the one or more blocks being associated with a plurality of data streams, according to an embodiment of the present invention.

Referring initially to FIG. 1, a flow diagram illustrates an exemplary methodology for replacing one or more blocks in a cache, the one or more blocks being associated with a plurality of data streams, according to an embodiment of the present invention. Methodology 100 may be carried out via a software algorithm implemented by a computer or methodology 100 may be carried out by an algorithm hard-coded into a processor and/or memory. In an exemplary embodiment, methodology 100 is applied to a storage device such as a cache, for instance, a fully associative decompression cache. A fully associative decompression cache may involve data decompression and decompressing multiple data streams as disclosed respectively in U.S. application Ser. No. 12/175,214, entitled "Method and Apparatus for Data Decompression in the Presence of Memory Hierarchies," filed on Jul. 17, 2008, and U.S. application Ser. No. 12/177,440, entitled "Method and Apparatus for Concurrent and Stateful Decompression of Multiple Compressed Data Streams," filed on Jul. 22, 2008, the disclosures of which are incorporated by reference herein. The cache may be coupled to a processor, or one or more processor cores when dealing with a compression hardware accelerator, handling multiple streams of incoming data (e.g., data from multiple user connections). Data from the multiple data streams are stored in the cache allowing for high-speed data retrieval; accessing data from a cache may be faster than retrieving data from other storage devices such as off-chip random-access memory (RAM), disks, hard drives, etc. It is to be appreciated that methodology 100 is not limited to any particular embodiment of implementation.

In an illustrative embodiment, the cache is 128 KB in size and comprises sixty-four blocks of two KB units. However, it is to be appreciated that the cache may be any size and may comprise any number of blocks. Data from multiple data streams may be stored in the cache as they are received. As a result, the data in the cache may be mixed. For example, the first block of the cache may comprise data from data stream A, the second block of the cache may comprise data from data stream B, and the third block of the cache may comprise data from data stream C. Data in the cache may be handled more efficiently if organized; therefore, the blocks in the cache are grouped into one or more groups (step 102). In an exemplary embodiment, the blocks of data within the cache are logically organized according to data stream. It should be noted, however, that this does not necessarily mean physically reorganizing the blocks of data within the cache. In an illustrative embodiment, the blocks of data from a specific data stream are chronologically ordered and maintained via a linked list. For instance, a data stream A may transmit three blocks b of data at times t=1, t=6, and t=12, represented as $A_b(t=n)$. And, the linked list for data stream A may be represented as: $A_1(t=1) \rightarrow A_2(t=6) \rightarrow A_3(t=12)$.

At step 104, one or more incoming blocks of data from a data stream may be received and considered for storage within the cache. In an exemplary embodiment, one or more blocks of data stored in the cache may need to be invalidated to create space for the one or more incoming blocks. At step 106, one or more blocks in the cache may be invalidated to free space. The invalidation step may be in accordance with a cache replacement policy. An exemplary cache replacement policy will be described below with reference to FIG. 2. At step 108, the one or more incoming blocks are stored in the cache. It should be appreciated that methodology 100 may efficiently maximize the number of data streams maintained within the cache.

Figure 2:
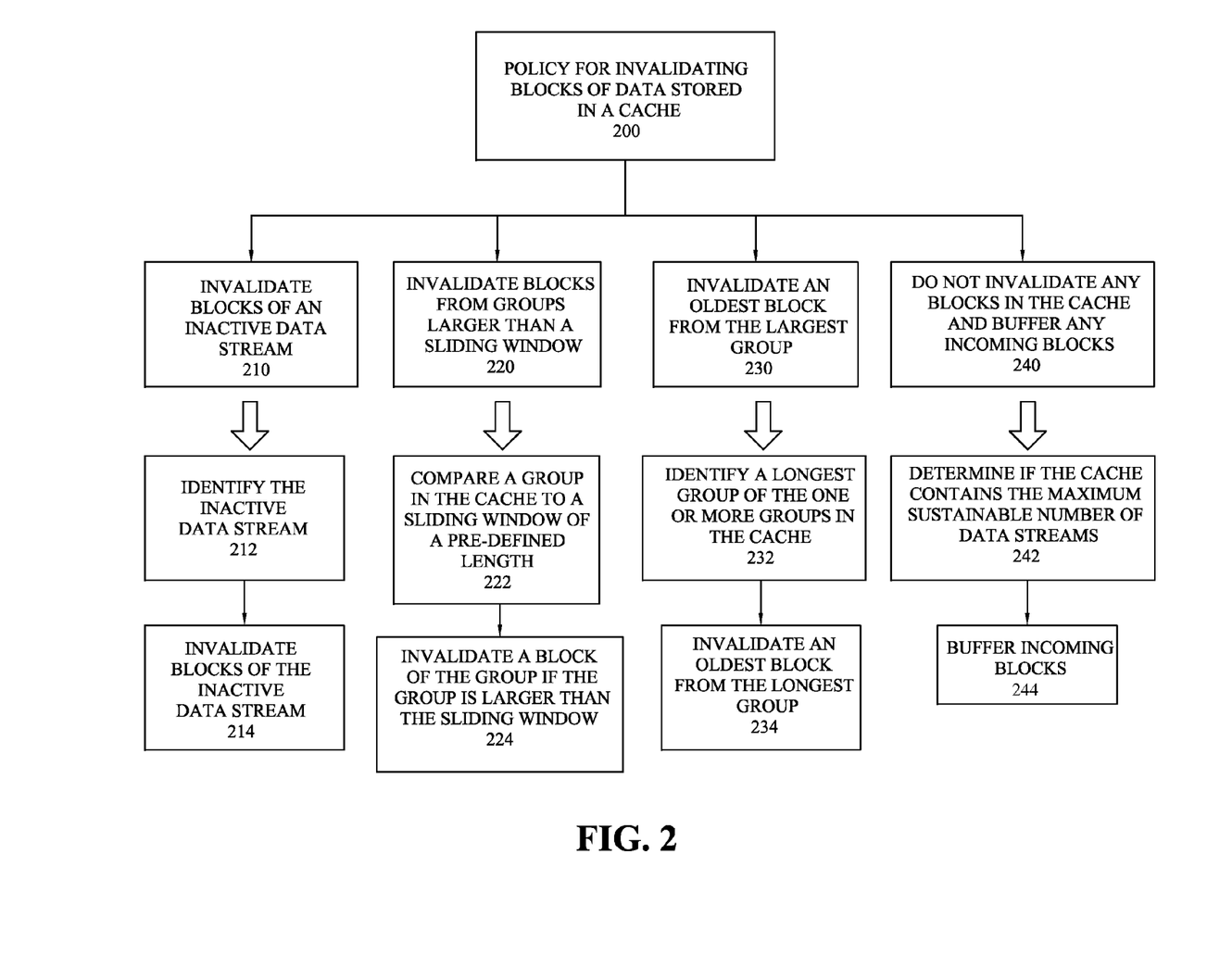
FIG. 2 is a flow diagram illustrating an exemplary cache replacement policy, according to an embodiment of the present invention.

Referring now to FIG. 2, a flow diagram illustrates an exemplary cache replacement policy, according to an embodiment of the present invention. It should be noted that FIG. 2 describes one embodiment of step 106 of FIG. 1. A policy for invalidating blocks of data stored in a cache 200 may be applied to a full cache. However, it should be appreciated that policy 200 may be applied to caches that are partially full. In an exemplary embodiment, policy 200 may comprise four general techniques for invalidating blocks of data stored in a cache: (1) invalidating blocks of an inactive data stream (210); (2) invalidating blocks from groups (e.g., data streams) larger than a sliding window (220); (3) invalidating an oldest block from a largest group (230); and (4) buffering any incoming blocks instead of invalidating any blocks in the cache (240). These four techniques may be applied individually, concurrently, or in combination, in any order. For example, in one illustrative embodiment, one or more blocks of a cache may be invalidated by first invalidating blocks of an inactive data stream followed by invalidating blocks from groups larger than a sliding window. Next, an oldest block from a largest group may be invalidated. If one or more blocks in the cache cannot be invalidated, incoming blocks may be buffered. However, it should be appreciated that the present invention is not limited to this one illustrative embodiment.

Invalidating blocks of an inactive data stream (210) is one way of freeing space in the cache. It should be appreciated that data of active data streams are more likely to be accessed than data from inactive data streams. For instance, if a data stream connection is terminated, the data streaming through the terminated connection is interrupted and any data successfully stored in the cache may no longer be valid due to the lapse in connectivity. At step 212, inactive data streams are identified. In one illustrative embodiment, compressed data streams may arrive through TCP connections. If a TCP connection is finished or terminated (e.g., timed-out) the cache and/or a device managing the cache is notified. At step 214, one or more blocks of the inactive data stream stored in the cache are invalidated, i.e., any cache entries associated with the terminated data connection are invalidated. In one embodiment, all blocks in a cache associated with an inactive data stream may be invalidated even if there is space in the cache for incoming blocks.

Invalidating blocks from groups larger than a sliding window (220) is another way of freeing space in the cache. It is to be appreciated that in order to maintain a data stream in the cache, the entire history of the data stream need not be maintained in the cache. In many instances, the most recently stored data of a data stream is the most frequently accessed. Further, the most recently stored data may be the only data required to successfully maintain an uninterrupted data stream transmission. Therefore, the amount of data stored in the cache for a data stream may be limited. In an illustrative embodiment, a group of one or more blocks associated with a data stream may be limited to thirty-two KB of space. For instance, using the 128 KB cache example described above, the stored data of a data stream may not occupy more than 16 two KB blocks.

At step 222, a group of one or more blocks in the cache, which is associated with a given data stream, is compared to a sliding window of pre-defined length. In the example above, the sliding window is thirty-two KB in size. If a given group exceeds the length of the sliding window, one or more blocks of the given group are invalidated until the group falls within the length of the sliding window (step 224). For example, a group comprising 17 two KB blocks may be trimmed to 16 two KB blocks (e.g., 32 KB total). In one embodiment, any group within the cache exceeding the length of the sliding window may be trimmed automatically even if there is free space in the cache for incoming blocks of data.

In an exemplary embodiment, the one or more blocks invalidated at step 224 are the oldest (e.g., least recent) blocks of a given group. The oldest block of a given group may be identified via a linked list. For example, a group of blocks b arriving at various times t=n for data stream X may be represented as a linked list of $X_b(t=n)$, for example, $X_1(t=3) \rightarrow X_2(t=6) \rightarrow X_3(t=12) \rightarrow X_4(t=13) \rightarrow X_5(t=17) \rightarrow X_6(t=26) \rightarrow X_7(t=35) \rightarrow X_8(t=38) \rightarrow X_9(t=40) \rightarrow X_{10}(t=41) \rightarrow X_{11}(t=45) \rightarrow X_{12}(t=51) \rightarrow X_{13}(t=53) \rightarrow X_{14}(t=55) \rightarrow X_{15}(t=56) \rightarrow X_{16}(t=60) \rightarrow X_{17}(t=62)$. In this example, block $X_1(t=3)$ may be invalidated because it is the oldest block of the group. Further, it should be noted that the above group was selected for invalidation because it comprises 17 two KB blocks and therefore exceeds the 32 KB sliding window.

Another technique for freeing space in a cache involves invalidating an oldest block from the largest group (230). As noted above, the most recent data stored in a cache may be the most useful; therefore, blocks of least recent data may be invalidated. At step 232, a longest group of the one or more groups in the cache is identified. In an exemplary embodiment, the longest group may be identified using a linked list organized by group length; this is unlike the previously described linked list which organizes blocks of a group according to time. The linked list organized by group length may be a doubly linked list. For example, the linked list of the following groups, A, B, C, and D, of block length l=5, l=2, l=7, and l=8, respectively, may be represented as: $length_1=\{null\} \rightarrow length_2=\{B\} \rightarrow length_3=\{null\} \rightarrow length_4=\{null\} \rightarrow length_5=\{A\} \rightarrow length_6=\{null\} \rightarrow length_7=\{C\} \rightarrow length_8=\{D\}$. In this example, group D is the longest group. At step 234, the oldest/least recent block of group D is invalidated. The invalidation of an oldest block is described above with reference to step 224.

Returning to the example above, after the oldest block of group D is invalidated, group D may be moved to $length_7$, for example: $length_1=\{null\} \rightarrow length_2=\{B\} \rightarrow length_3=\{null\} \rightarrow length_4=\{null\} \rightarrow length_5=\{A\} \rightarrow length_6=\{null\} \rightarrow length_7=\{C, D\}$. In this updated linked list, the longest groups are C and D. In this scenario, the replacement policy 200 may be configured to randomly select one of the longest groups (i.e., C or D) for invalidation. In an alternative embodiment, the replacement policy 200 may select the oldest block of the two groups for invalidation.

In an additional illustrative embodiment, identifying a longest group for invalidation may be in accordance with a priority of an associated data stream. For example, in a quality of service scenario, there may be multiple data streams with varying levels of priority (e.g., high, medium, low, etc.), where one or more blocks of a low priority data stream are invalidated before one or more blocks of a high priority data stream. In one embodiment, a weight reflecting priority may be used to modify the length of a group associated with a given data stream. For instance, assume a new group E comprising two blocks; therefore, group E is the same length as group B with a length of two, l=2 (i.e., $length_2=\{B, E\}$).

However, assume group E is associated with a low priority data stream. Group E may be designated a weight w of three, where w modifies the length of group E, for example, the length of group E $length_1$ may equal weight w times length l: $length_1=w*l=3*2=6$. In this example, group E will be listed as $length_6$, even though group E has a block length of two: $length_1=\{null\} \rightarrow length_2=\{B\} \rightarrow length_3=\{null\} \rightarrow length_4=\{null\} \rightarrow length_5=\{A\} \rightarrow length_6=\{E\} \rightarrow length_7=\{C, D\}$. In this updated linked list, since group E is now larger than groups A and B, one or more blocks of group E would be invalidated before any blocks of groups A and B. In the alternative, group E may be associated with a high priority data stream and may be designated a weight w of 0.5, therefore, $length_1=w*l=0.5*2=1$. In this scenario, group E will be listed as $length_1$; therefore, one or more blocks of groups A, B, C, and D would be invalidated before any blocks of group E: $length_1\{E\} \rightarrow length_2\{B\} \rightarrow length_3=\{null\} \rightarrow length_4=\{null\} \rightarrow length_5=\{A\} \rightarrow length_6=\{null\} \rightarrow length_7=\{C, D\}$. It should be appreciated that invalidation of the oldest block of the longest group is not limited to the embodiments described herein.

In certain instances, policy 200 may choose not to invalidate any blocks in the cache and instead, policy 200 may buffer any incoming blocks of data in a secondary storage device, such as a disk, a hard drive, a secondary cache, a secondary memory, etc. (240). Policy 200 may not want to invalidate any blocks in the cache because the cache may be completely full and may comprise only one block from each maintained data stream. For instance, a 128 KB cache maintaining sixty-four data streams, each data stream being represented by 1 two KB block. In this example, if the cache were to accept a new block from a new data stream, a block of one of the maintained data streams must be invalidated. This may result in a round robin scenario where no data streams can be maintained by the cache because new data streams are constantly replacing old data streams.

At step 242, policy 200 determines if the cache contains the maximum sustainable number of data streams. In the example above, a 128 KB cache comprising 64 two KB blocks may only maintain sixty-four data streams. If the cache is maintaining the maximum number of sustainable data streams, incoming blocks may be buffered to another storage device (step 244). In an additional embodiment, if the incoming block is from a data stream already maintained by the cache, policy 200 may simply replace the block in the cache with the incoming block. This ensures that the most recent block of the data stream is maintained in the cache.

Figure 3:
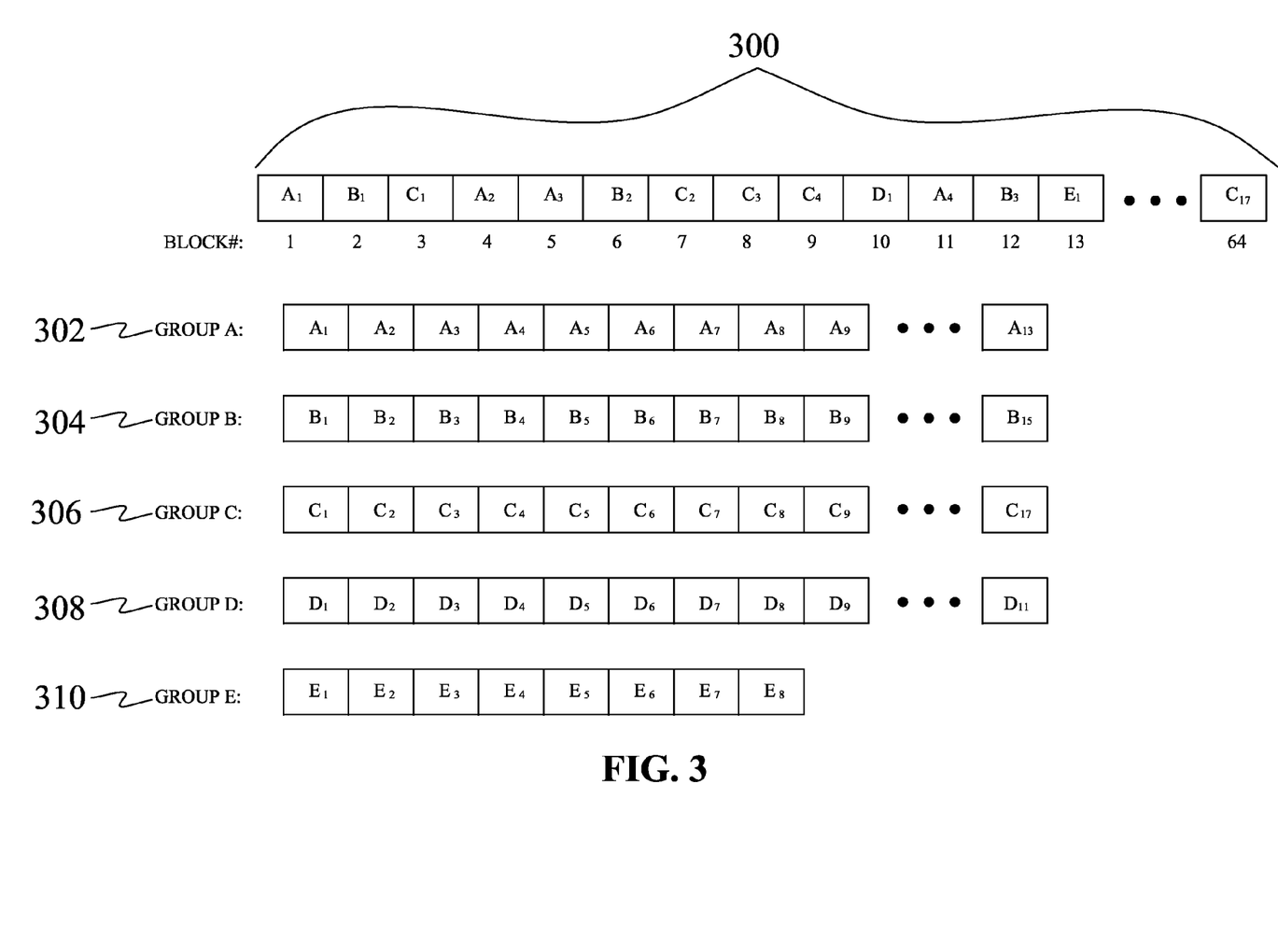
FIG. 3 is a diagram illustrating an exemplary grouping of one or more blocks of a cache, according to an embodiment of the present invention.

Referring now to FIG. 3, a diagram illustrates an exemplary grouping of one or more blocks of a cache, according to an embodiment of the present invention. FIG. 3 depicts one embodiment of step 102 of FIG. 1. In FIG. 3, a 128 KB cache 300 comprises 64 two KB blocks. Each block (i.e., blocks one through sixty-four) are occupied by one or more datum from a given data stream. It should be noted that blocks one through sixty-four are filled as one or more blocks of data are received from the multiple data streams; therefore, the blocks are mixed. In this example, cache 300 comprises one or more blocks of data b of a data stream X, represented as $X_b$.

The blocks of cache 300 may be organized chronology into groups (302, 304, 306, 308, and 310). Each group is associated with a given data stream. In FIG. 3, group A 302 comprises thirteen blocks from data stream A (i.e., $A_1, A_2, \ldots, A_{13}$). Group B 304 comprises fifteen blocks from data stream B (i.e., $B_1, B_2, \ldots, B_{15}$). Group C 306 comprises seventeen blocks from data stream C (i.e., $C_1, C_2, \ldots, C_{17}$). Group D 308 comprises eleven blocks from data stream D (i.e., $D_1, D_2, \ldots, D_{11}$). And, group E 310 comprises eight blocks from data stream E (i.e., $E_1, E_2, \ldots, E_8$). Each group may be organized via one or more linked lists. In an additional embodiment, each group may also comprise a counter stating the number of blocks allocated to a specific data stream. This counter may be used to: (1) invalidate the tail of a linked list; (2) determine the longest group; and (3) prevent invalidation of a block of a data stream that only has one block (e.g., counter=1).

Figure 4:
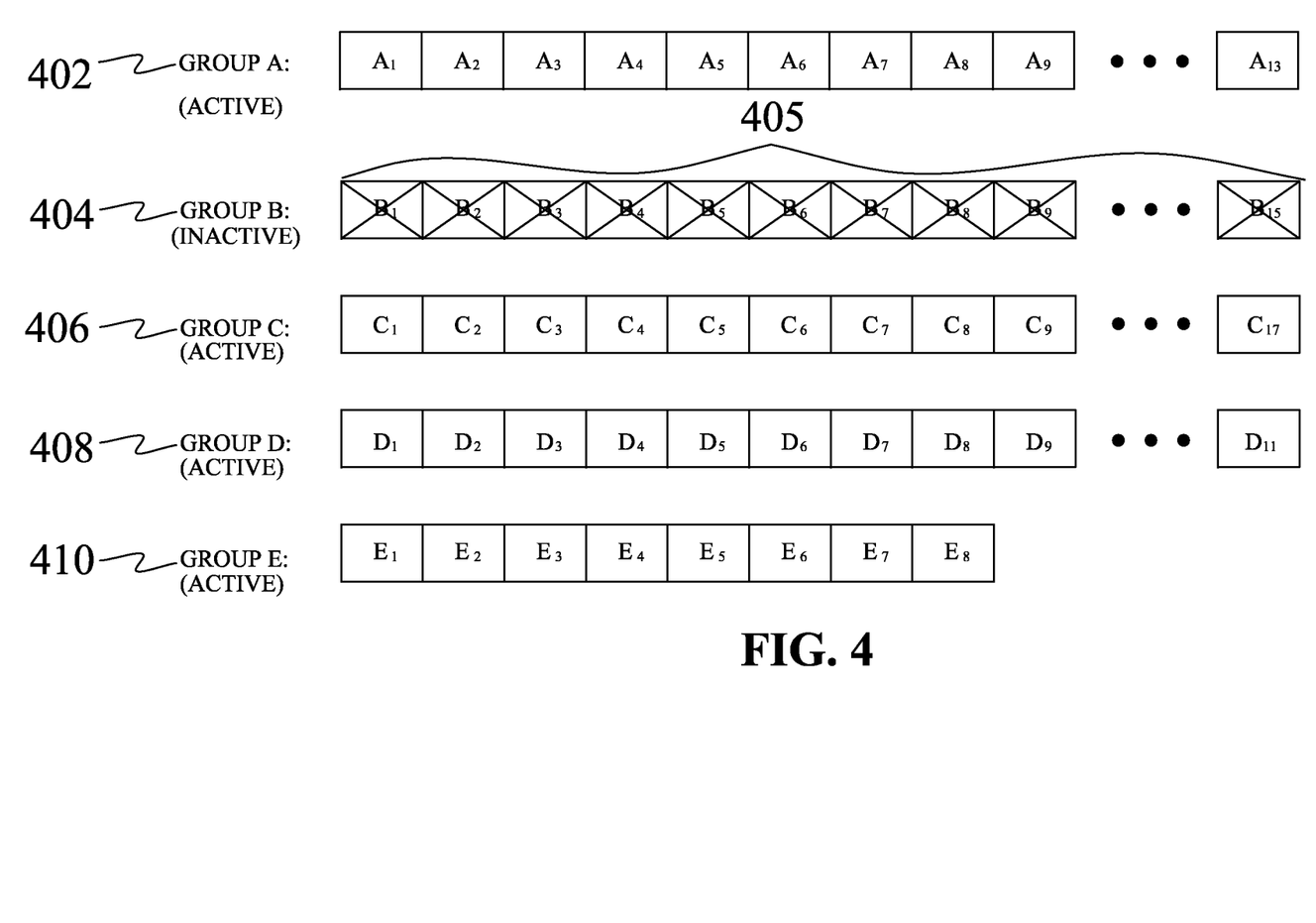
FIG. 4 is a diagram illustrating an exemplary invalidation of one or more blocks of an inactive data stream, according to an embodiment of the present invention.

Referring now to FIG. 4, a diagram illustrates an exemplary invalidation of one or more blocks of an inactive data stream, according to an embodiment of the present invention. FIG. 4 shows one embodiment of invalidating blocks of an inactive data stream as described with reference to FIG. 2, 210. FIG. 4 depicts five groups of one or more blocks (402, 404, 406, 408, and 410). Groups A, C, D, and E comprise one or more blocks associated with active data streams and group B comprises one or more blocks associated with an inactive data stream. One or more blocks of inactive data stream 404 (e.g., group B) may be invalidated 405 to free space in the cache.

Figure 5:
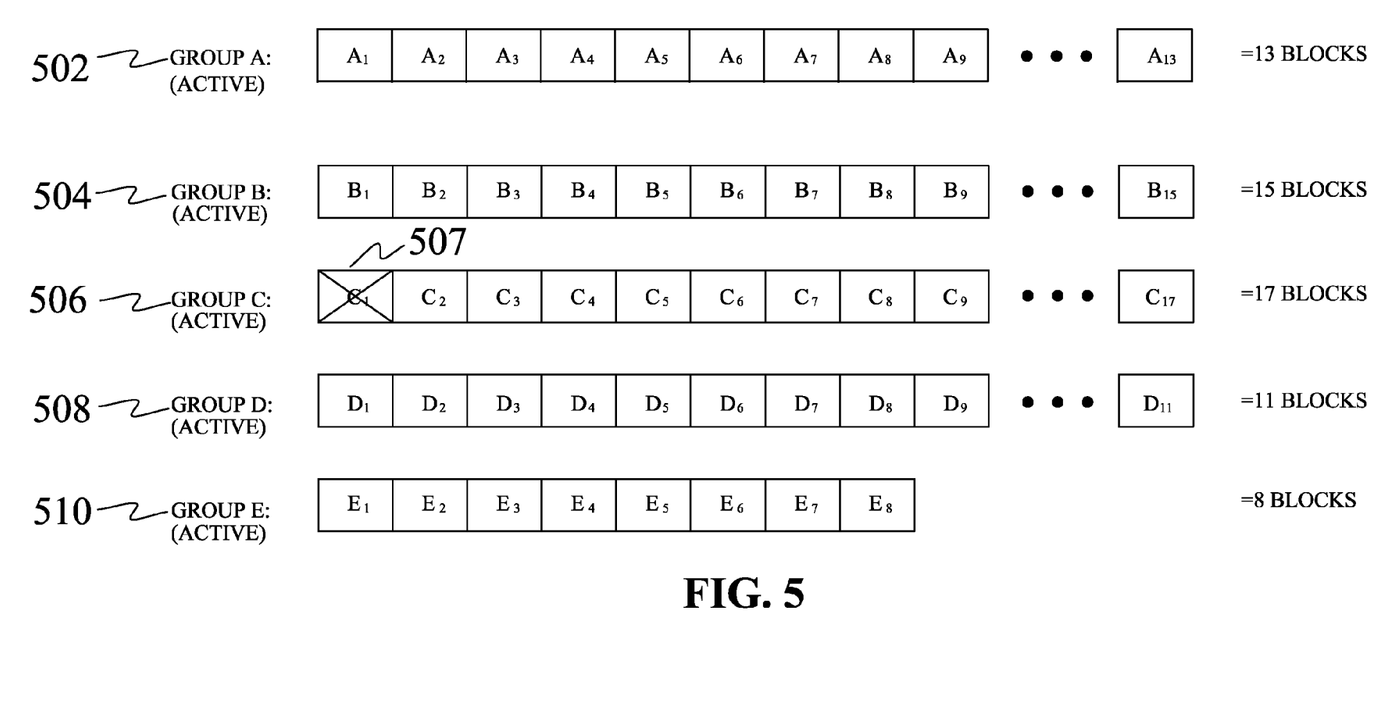
FIG. 5 is a diagram illustrating an exemplary invalidation of a block of a group larger than the size of a sliding window, according to an embodiment of the present invention.

Referring now to FIG. 5, a diagram illustrates an exemplary invalidation of a block of a group larger than the size of a sliding window, according to an embodiment of the present invention. FIG. 5 shows one embodiment of invalidating one or more blocks using a sliding window as described with reference to FIG. 2, 220. FIG. 5 depicts five groups of one or more blocks (502, 504, 506, 508, and 510) associated with active data streams. Group A 502 comprises thirteen blocks (i.e., $A_1, A_2, \ldots, A_{13}$), group B 504 comprises fifteen blocks (i.e., $B_1, B_2, \ldots, B_{15}$), group C 506 comprises seventeen blocks (i.e., $C_1, C_2, \ldots, C_{17}$), group D 508 comprises eleven blocks (i.e., $D_1, D_2, \ldots, D_{11}$), and group E 510 comprises eight blocks (i.e., $E_1, E_2, \ldots, E_8$). In this example, the sliding window is thirty-two KB in size. This is equivalent to 16 two KB blocks. Group C 506 exceeds the length of the sliding window and therefore, the oldest block 507 of group C 506 is invalidated.

Figure 6:
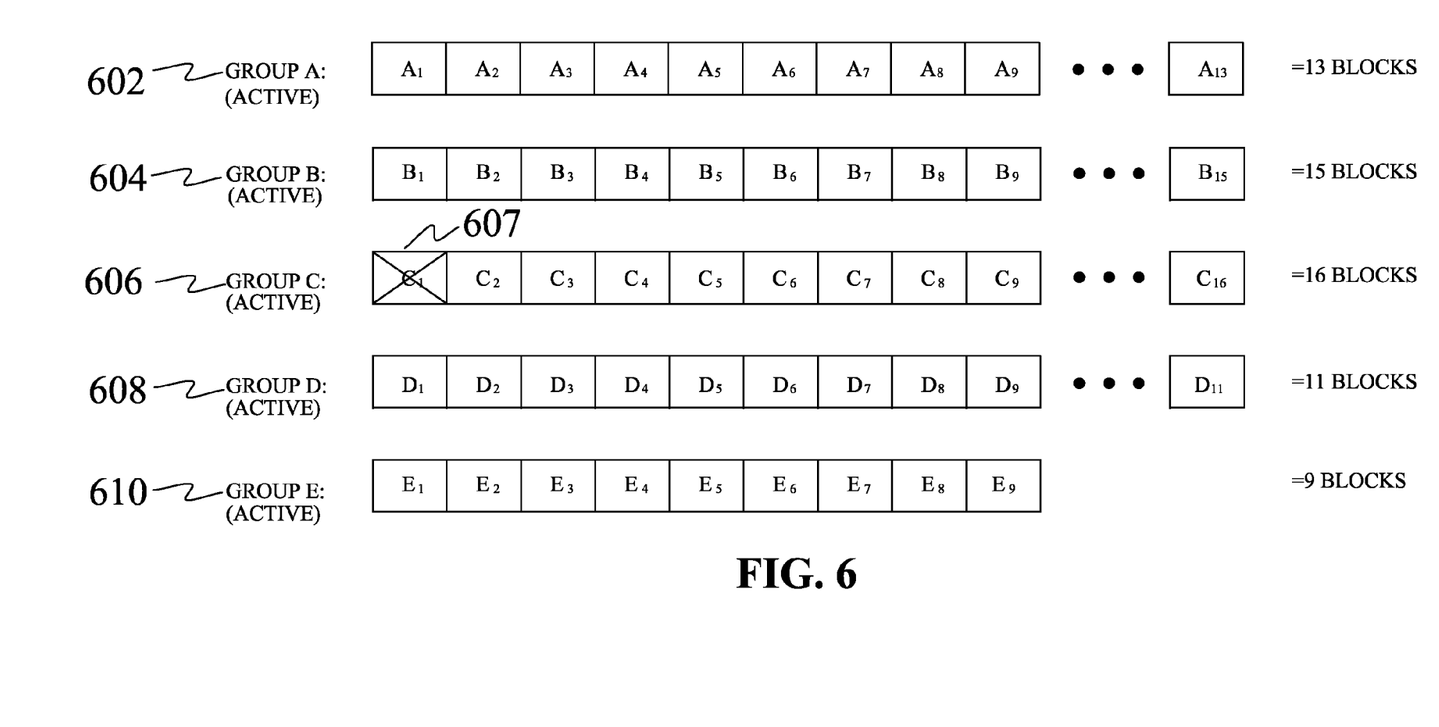
FIG. 6 is a diagram illustrating an exemplary invalidation of a block of a longest group in a cache, according to an embodiment of the present invention.

Referring now to FIG. 6, a diagram illustrates an exemplary invalidation of a block of a longest group in a cache, according to an embodiment of the present invention. FIG. 6 shows one embodiment of invalidating an oldest block from a largest group as described with reference to FIG. 2, 230. FIG. 6 depicts five groups of one or more blocks (602, 604, 606, 608, and 610) associated with active data streams. Group A 602 comprises thirteen blocks (i.e., $A_1, A_2, \ldots, A_{13}$), group B 604 comprises fifteen blocks (i.e., $B_1, B_2, \ldots, B_{15}$), group C 606 comprises sixteen blocks (i.e., $C_1, C_2, \ldots, C_{16}$), group D 608 comprises eleven blocks (i.e., $D_1, D_2, \ldots, D_{11}$), and group E 610 comprises nine blocks (i.e., $E_1, E_2, \ldots, E_9$). In this example, the longest group is group C 606 with sixteen blocks. In an illustrative embodiment, the oldest block 607 of group C 606 is invalidated. It should be noted that after block 607 is invalidated, group C 606 will be of equal length to group B 604. If another block is to be invalidated, a block from either group C 606 or group B 604 may be selected.

Figure 7:
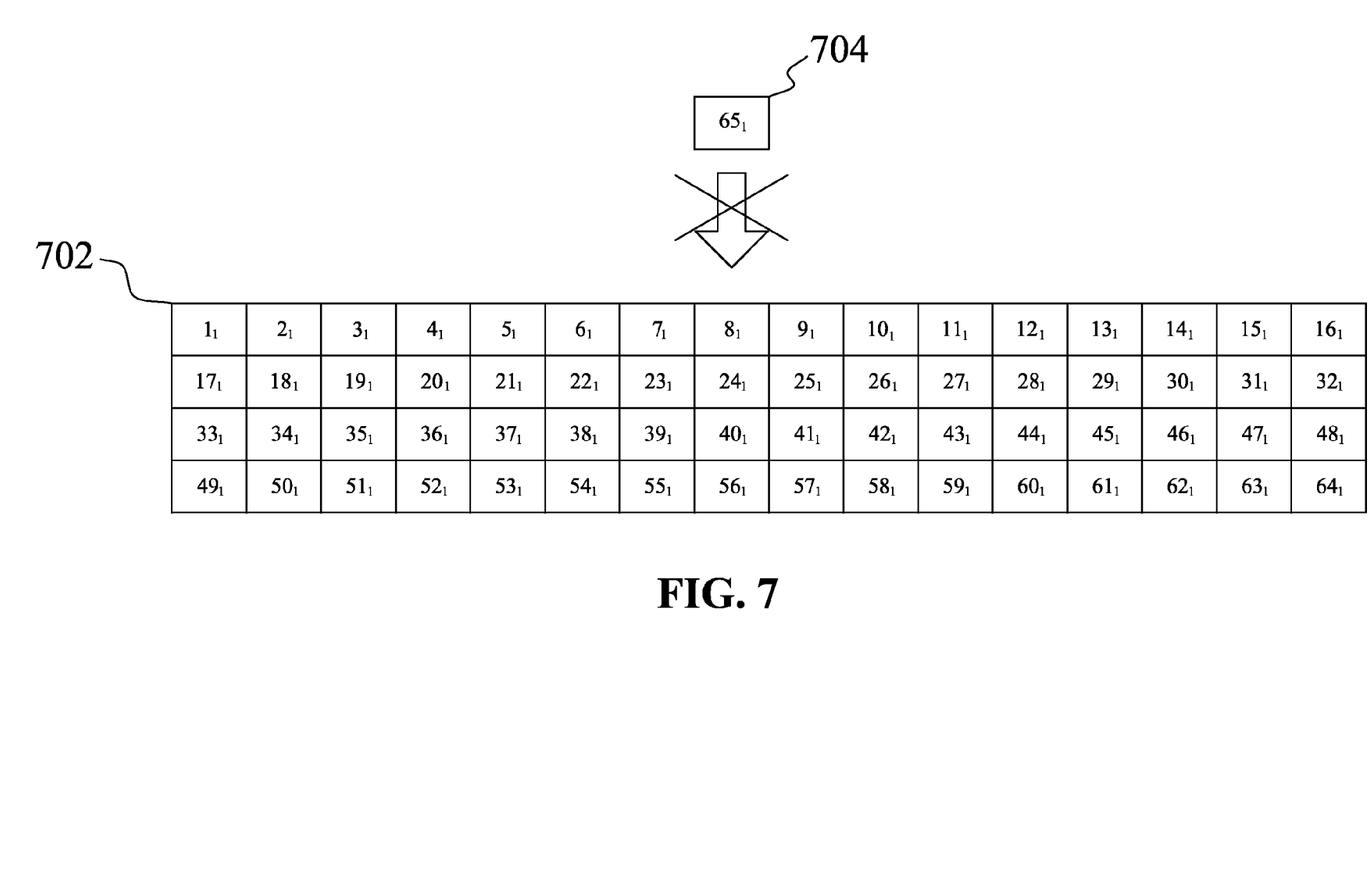
FIG. 7 is a diagram illustrating an exemplary scenario of when a cache cannot support a block of data from a new data stream, according to an embodiment of the present invention.

Referring now to FIG. 7, a diagram illustrates an exemplary scenario of when a cache cannot support a block of data from a new data stream, according to an embodiment of the present invention. FIG. 7 depicts the scenario described with reference to FIG. 2, 240. In this example, a 128 KB cache 702 comprising 64 two KB blocks is completely full. Further, cache 702 maintains sixty-four data streams X, each data stream being represented by one block b, represented as $X_b$ (i.e., $1_1, 2_1, \ldots 64_1$). An incoming block of data 704 from a new data stream X, represented as 651, is received. In this scenario, cache 702 cannot accept block 704 without invalidating a block in the cache. Since the cache 702 is filled to capacity (e.g., cache 702 maintains the maximum number of sustainable data streams), replacing a block in the cache with block 704 would result in a round robin scenario. In a round robin scenario, old data streams are constantly replaced by new data streams and, as a result, the cache may yield a 0% hit rate when one tries to access blocks of a specific data stream from the cache. Therefore, in an illustrative embodiment, block 704 is buffered and none of the blocks in cache 702 are invalidated.

Figure 8:
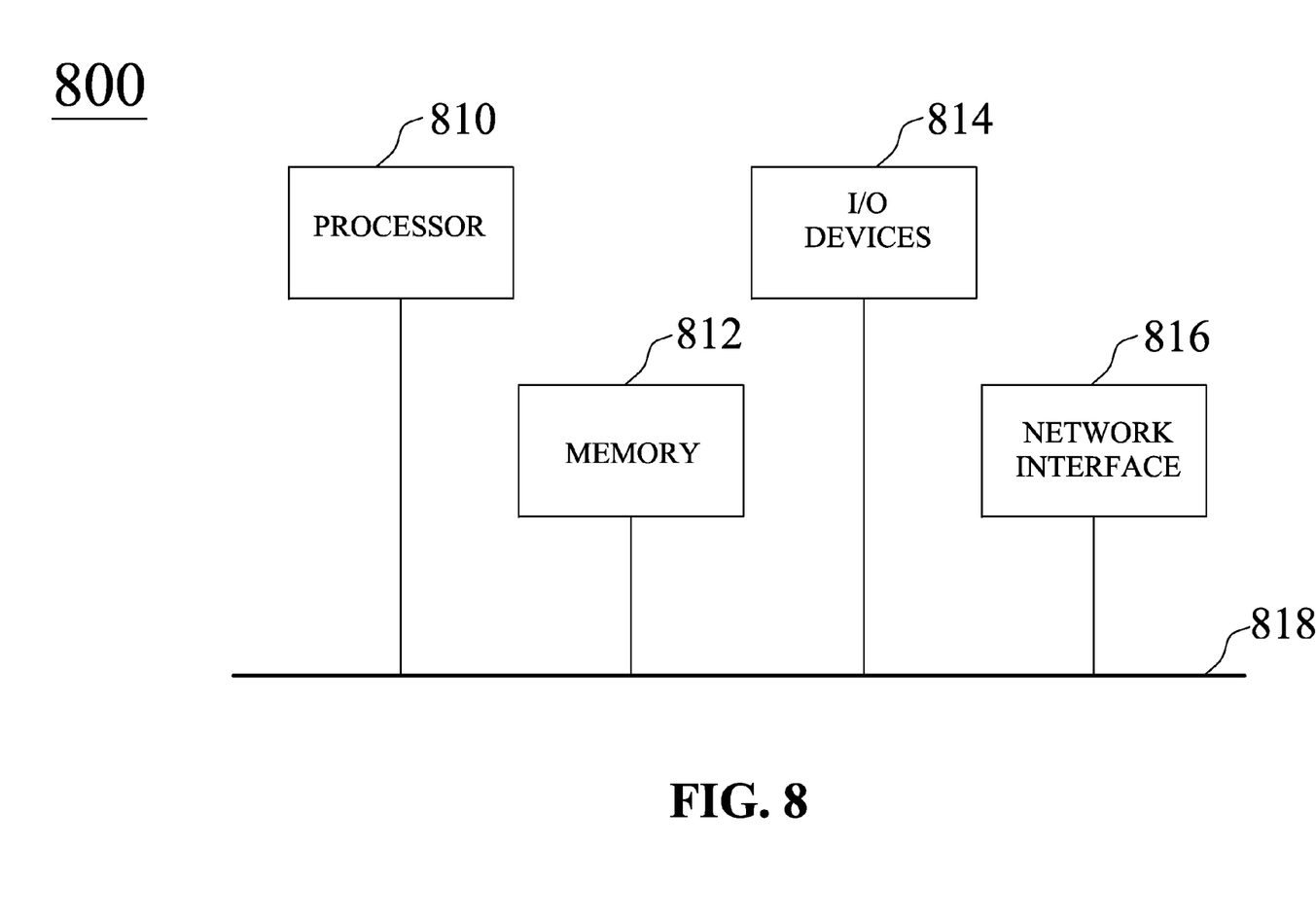
FIG. 8 is a diagram illustrating an illustrative hardware implementation of a computing system in accordance with which one or more components/methodologies of the present invention may be implemented, according to an embodiment of the present invention.

Referring now to FIG. 8, block diagram 800 illustrates an exemplary hardware implementation of a computing system in accordance with which one or more components/methodologies of the invention (e.g., components/methodologies described in the context of FIGS. 1-7) may be implemented, according to an embodiment of the present invention.

As shown, the techniques for replacing one or more blocks in a cache, the one or more blocks being associated with a plurality of data streams, may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer-readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the illustrative principles of the present invention may be embodied as a system, method, or computer program product. Accordingly, the illustrative principles of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the illustrative principles of the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for maintaining a cache of blocks from a plurality of data streams, the method comprising executing the following steps on a computer:
   storing blocks of data of a plurality of different data streams in a cache, wherein the blocks are stored in the cache by grouping the blocks in the cache into groups of blocks, each group of blocks corresponding to a respective one of the plurality of different data streams;
   receiving one or more incoming blocks of an active one of the plurality of different data streams;
   invalidating at least one stored block of at least one group of blocks in the cache to free space for storing the one or more incoming blocks, wherein invalidating comprises comparing a length of the at least one group of blocks to a sliding window of a pre-defined length., and invalidating one or more blocks in the at least one group of blocks until the length of the at least one group of blocks does not exceed the predefined length of the sliding window; and
   storing the one or more incoming blocks in the cache.

2. The method of claim 1, wherein the cache is a fully associative decompression cache.

3. The method of claim 1, wherein the step of invalidating comprises invalidating one or more oldest blocks of the at least one group of blocks until the length of the at least one group of blocks does not exceed the predefined length of the sliding window an.

4. The method of claim 3, further comprising the step of chronologically ordering the one or more blocks of the at least one group of blocks using a linked list, and using the linked list to identify the one or more oldest blocks of the at least one group of blocks.

5. The method of claim 1, further comprising the step of ordering the one or more groups in the cache by length using a linked list.

6. The method of claim 1, wherein invalidating further comprises identifying a given active data stream having a longest group of blocks associated with the given active data stream, identifying an oldest block among a plurality of blocks of the longest group of blocks, and invalidating the oldest block among the plurality of blocks of the longest group of blocks of the given active data stream, wherein the oldest block is a block that was stored in the cache at some time prior to the times that all other blocks of the longest group of blocks of the given data stream were stored in the cache.

7. The method of claim 6, wherein identifying a longest group of blocks further comprises modifying a given length of a given group in the cache with a weight, wherein the weight is in accordance with a priority of the data stream corresponding to the given group.

8. The method of claim 1, wherein the step of invalidating further comprises:
  identifying one or more inactive data streams associated with at least one terminated data stream connection; and
  invalidating at least one block of one or more groups of blocks corresponding to the one or more inactive data streams.

9. The method of claim 1, further comprising the step of buffering a given incoming block associated with a new data stream when each data stream in the cache is represented by one block.

10. The method of claim 1, further comprising:
  for each data stream, maintaining a corresponding counter to count a number of blocks of the data stream; and
  using the counter corresponding to a given data stream to one of (i) invalidate a tail of a linked list that identifies an oldest block of the given data stream, (ii) determine if the given data stream has a longest group of blocks among all the data streams, and (iii) prevent invalidation of a block of the given data stream if the counter indicates that the given data stream has only one block.

11. An apparatus for maintaining a cache storing blocks from a plurality of data streams, the apparatus comprising:
  a memory; and
  at least one processor coupled to the memory and operative to:
    store blocks of data of a plurality of different data streams in a cache, wherein the blocks are stored in the cache by grouping the blocks in the cache into groups of blocks, each group of blocks corresponding to a respective one of the plurality of different data streams;
    receive one or more incoming blocks of an active one of the plurality of different data streams;
    invalidate at least one stored block of at least one group of blocks in the cache to free space for storing the one or more incoming blocks, wherein invalidating comprises comparing a length of the at least one group of blocks to a sliding window of a pre-defined length, and invalidating one or more blocks in the at least one group of blocks until the length of the at least one group of blocks does not exceed the predefined length of the sliding window; and
    store the one or more incoming blocks in the cache.

12. The apparatus of claim 11, wherein the cache is a fully associative decompression cache.

13. The apparatus of claim 11, wherein during the operation of invalidating, the at least one processor is operative to invalidate one or more oldest blocks of the at least one group of blocks until the length of the at least one group of blocks does not exceed the predefined length of the sliding window an.

14. The apparatus of claim 13, wherein the at least one processor is further operative to chronologically order the one or more blocks of the at least one group of blocks using a linked list, and use the linked list to identify the one or more oldest blocks of the at least one group of blocks.

15. The apparatus of claim 11, wherein the at least one processor is further operative to order the one or more groups in the cache by length using a linked list.

16. The apparatus of claim 11, wherein during the operation of invalidating, the at least one processor is further operative to identify a given active data stream having a longest group of blocks associated with the given active data stream, identify an oldest block among a plurality of blocks of the longest group of blocks, and invalidate the oldest block among the plurality of blocks of the longest group of blocks of the given active data stream, wherein the oldest block is a block that was stored in the cache at some time prior to the times that all other blocks of the longest group of blocks of the given data stream were stored in the cache.

17. The apparatus of claim 16, wherein during the operation of identifying a longest group blocks, the at least one processor is further operative to modify a given length of a given group in the cache with a weight, wherein the weight is in accordance with a priority of the data stream corresponding to the given group.

18. The apparatus of claim 11, wherein during the operation of invalidating, the at least one processor is further operative to:
  identify one or more inactive data streams, the one or more inactive data streams being associated with at least one terminated data stream connection; and
  invalidate at least one block of one or more groups corresponding to the inactive data stream.

19. The apparatus of claim 11, wherein the at least one processor is further operative to buffer a given incoming block associated with a new data stream when each data stream in the cache is represented by one block.

20. The apparatus of claim 11, wherein the at least one processor is further operative to:
  for each data stream, maintain a corresponding counter to count a number of blocks of the data stream; and
  use the counter corresponding to a given data stream to one of (i) invalidate a tail of a linked list that identifies an oldest block of the given data stream, (ii) determine if the given data stream has a longest group of blocks among all the data streams, and (iii) prevent invalidation of a block of the given data stream if the counter indicates that the given data stream has only one block.

21. An article of manufacture comprising a non-transitory computer-readable storage medium having program instructions stored thereon, wherein the stored program instructions are executable by a computer to maintain a cache storing blocks from a plurality of data streams, the program instructions comprising:
  a first program instruction to store blocks of data of a plurality of different data streams in a cache, wherein the blocks are stored in the cache by grouping the blocks in the cache into groups of blocks, each group of blocks corresponding to a respective one of the plurality of different data streams;
  a second program instruction to receive one or more incoming blocks of an active one of the plurality of different data streams;
  a third program instruction to invalidate at least one stored block of at least one group of blocks in the cache to free space for storing the one or more incoming blocks, wherein invalidating comprises comparing a length of the at least one group of blocks to a sliding window of a pre-defined length, and invalidating one or more blocks in the at least one group of blocks until the length of the at least one group of blocks does not exceed the pre-defined length of the sliding window; and
  a fourth program instruction to store the one or more incoming blocks in the cache.

* * * * *